Jan. 6, 1948.                P. B. RICHARDSON                2,434,177
                              WEIGHING APPARATUS
                            Filed May 10, 1944         5 Sheets-Sheet 1

Inventor
Philip B. Richardson,
By
Attorneys

Jan. 6, 1948.   P. B. RICHARDSON   2,434,177
WEIGHING APPARATUS
Filed May 10, 1944   5 Sheets-Sheet 5

Inventor
Philip B. Richardson,
By
Attorneys

Patented Jan. 6, 1948

2,434,177

UNITED STATES PATENT OFFICE 2,434,177

WEIGHING APPARATUS

Philip B. Richardson, Montclair, N. J., assignor to Richardson Scale Company, Clifton, N. J., a corporation of New Jersey Application May 10, 1944, Serial No. 534,933

18 Claims. (Cl. 249—42)

The present invention relates to improvements in weighing machines, and more especially to those of the automatic type in which the weighing and discharging operations are performed successively and automatically under control of the weighing mechanism.

The primary object of the invention is to provide a weighing machine of this type which is capable of rapidly and accurately weighing materials which can not be fed regularly or smoothly and which cling more or less to the weighing element of the machine, such for example as ore containing large lumps, fines and mud.

Heretofore, in weighing machines employed for weighing materials which flow smoothly, over-feed of material to the weigh receptacle has been avoided by compensating for the falling material at the moment the feed is cut off, but such compensation can not be employed in weighing materials which contain large lumps, and materials which contain mud or other clingy or sticky material could not be weighed accurately because such material adheres to the weigh receptacle so that all of the weighed material is not fully discharged.

These difficulties are overcome by the present invention, which enables such lumpy or sticky materials to be weighed rapidly and accurately. According to the present invention, the material may be fed without compensation to the weigh receptacle to make up a load which includes the predetermined desired weighing and a predetermined permanent residue, the total load is balanced by the weighing mechanism and the feed cut off, the amount of over-feed represented by the material falling to the weigh receptacle at the moment of cut-off is balanced out, and an amount of the material of the desired predetermined weight is then discharged from the weigh receptacle, leaving thereon the predetermined permanent residue, and the amount of over-feed.

Certain features of the invention are especially applicable to automatic weighing machines of the type embodying weighing means which can be discharged by any suitable form of discharge means under control of the weighing mechanism.

In the preferred embodiment of the invention, the weighing mechanism comprises main and tare beams which conjointly support the weigh receptacle but are freely movable independently of one another, the tare beam being counterweighted to balance a predetermined permanent residue which will include the material clinging to the weigh receptacle, and the main beam being counterweighted to balance said permanent residue and the desired predetermined weighing, and a shelf lever connected to the main and tare beams and having a poise which travels thereon to balance out the amount of material over-fed to the weigh receptacle, means being provided for automatically stopping the feed of material when the main beam comes to balance and operating the poise on the shelf lever to balance out the over-feed of material, and for discharging material from the weigh receptacle until the desired predetermined weighing has been discharged. Accurate weighings are thus attained although the material being fed to the weigh receptacle at the moment of stopping of the feed is not compensated for, and irrespective of the amount of material that may adhere to the weigh receptacle as a residue after each discharge.

In the accompanying drawings—

Similar parts are designated by the same reference characters in the several views.

The invention is shown applied in the present instance to a weighing machine having a weigh receptacle in the form of an endless belt conveyor 10 mounted to travel over a head pulley 11 and a tail pulley 12, these pulleys being journaled in an inclined frame 13 having sides for confining the material to the conveyor. The head pulley 11 at the upper end of the frame is provided with an electric motor 14 having a suitable reduction gearing 15 and sprocket 16 for driving the head pulley through a chain 17 and a sprocket wheel 18 fixed to the head pulley, and thereby cause discharge of material over the head pulley and into a suitable chute 8. A spring actuated scraper 9 may be arranged to act on the conveyor belt below the head pulley to prevent excess accumulation of muddy or sticky material on the conveyor belt. The conveyor supporting frame is suspended at its sides from suitable scale mechanism, such as a pair of levers 19 and 20 suspended by rods 21 and 22 from a support 23, the frame 13 being suspended from said levers by rods 24 and 25, and said levers being connected together by a shackle 26. The weigh beams are contained in a beam box 27 supported in a relatively fixed frame 28, and are connected to the conveyor supporting levers by a rod 29. The material to be weighed is fed to the tail end of the weigh conveyor by a feed conveyor 30, which may be of any suitable construction but is preferably of the endless belt type and provided with an electric motor 31 for operating it in a direction to feed the material over the head pulley 30$^a$ onto the tail end of the weigh conveyor 10.

Figure 1:
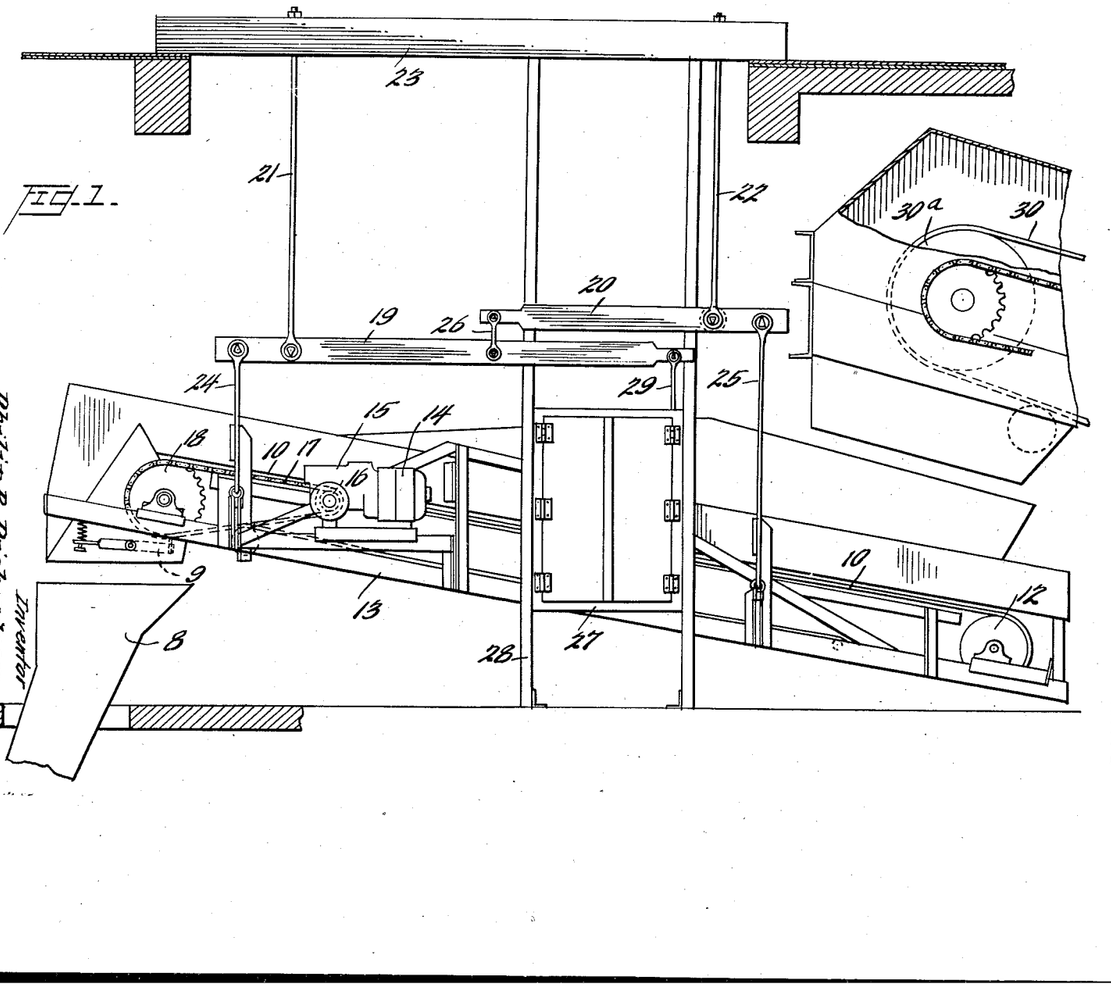
Figure 1 is an elevation of the weighing machine of the conveyor type to which the present invention is shown applied.
Figure 2:
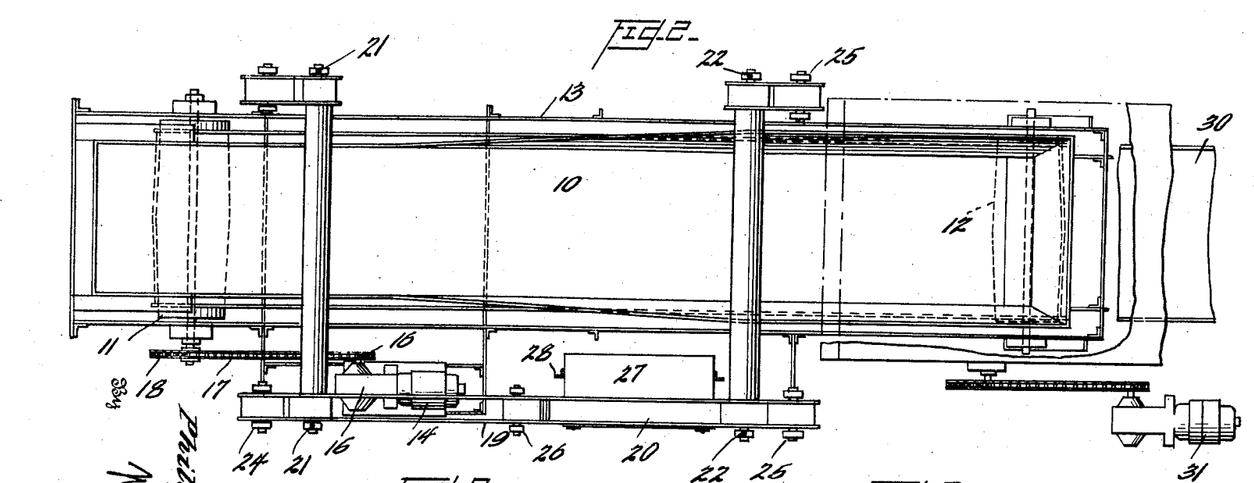
Figure 2 is a top plan of the machine.
Figure 3:
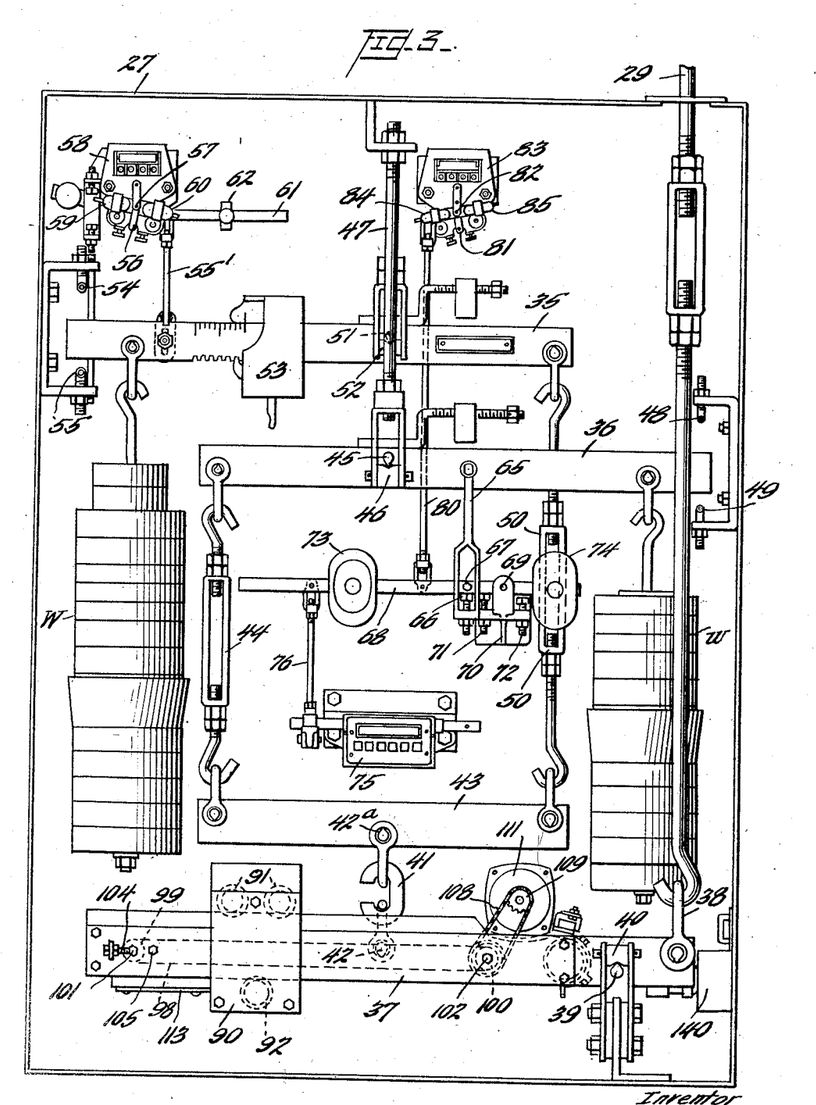
Figure 3 is an elevation of the weighing mechanism.

The weighing mechanism in the beam box, as shown in Fig. 3, comprises generally a main beam 35, a tare beam 36 and a shelf lever which comprises a pair of members 37 and 37$^a$ rigidly connected by cross members 37$^b$. The rod 29 is connected by the shackle 38 to one end of the member 37 of the shelf lever, both members of this lever being fulcrumed by their knife edges 39 on bearings 40 fixed to the bottom of the beam box, and the member 37$^a$ of the shelf lever is connected by a shackle 41 and knife edges 42 and 42$^a$ to a lever 43 at a point between its ends. One end of the lever 43 is connected by the turn-buckle 44 and shackles to one end of the tare beam 36 which is fulcrumed by its knife edges 45 on bearings 46 on a rod 47, the latter being fixed to the top of the beam box, the other end of the tare beam being provided with counterweights $w$, the swing of this beam being limited by upper and lower stops 48 and 49. The other end of the lever 43 is connected by the turn-buckle 50 and shackles to one end of the main beam 35 which is fulcrumed by its knife edges 51 on bearings 52 supported by the rod 47, the other end of the main beam being provided with counterweights W. The main beam may be provided with a slidable poise 53 for fine adjustments of the counterweighting thereof, and the swinging movements of the main beam are limited by upper and lower stops 54 and 55.

The counterweight $w$ for the tare beam is of a value sufficient to over-balance any probable residue, such as sticky material that may adhere to the weigh conveyor or fail to discharge therefrom, and the weight W for the main beam is of a value equal to the counterweight $w$ on the tare beam plus an amount equal to that required to balance the desired predetermined weighings.

The main beam 35 is pivotally connected to a rod 55' which is pivotally connected to a switch member 56, the latter being pivoted at 57 to a switch base 58 secured in the beam box, the pivoted switch member carrying a pair of mercury switches 59 and 60 arranged in reverse relation thereon, so that the switch 59 will be opened and the switch 60 closed when the main beam swings into balanced position, and the switch 59 will be closed and the switch 60 opened when the main beam rises toward or against the upper stop 54. The switch member 56 preferably has a lever 61 fixed thereto to rock therewith, this lever having a compensating weight or poise 62 adjustable slidably thereon, for a purpose hereinafter described.

The tare beam 36 has a pendant 65 pivotally suspended therefrom and provided with a set screw 66 arranged to engage a pin 67 projecting laterally from a compensating lever 68 and thereby apply a force to the tare beam tending to bring it to balance, while the tare beam is in its raised position. The compensating lever is pivoted at 69 on a bracket 70 supported in fixed position in the beam box, the bracket having a pair of set screws 71 and 72 which limit the swinging movements of this lever. A pair of weights 73 and 74 are mounted on the lever 68 at opposite sides of its pivot, the weight 73 being adjustable along this lever toward or from its pivot to compensate for light or heavy weighings. A counter 75 of any well known type may be connected by a rod 76 to this compensating lever for registering the number of weighings by the machine.

The compensating lever is pivotally connected to a rod 80 the upper end of which is pivotally connected to a switch member 81 pivoted at 82 on a switch base 83 fixed in the beam box, this switch member carrying a pair of mercury switches 84 and 85 arranged in reverse relation thereon so that the switch 84 is closed and the switch 85 opened when the tare beam swings into balanced position, and the switch 84 is opened and the switch 85 is closed when the tare beam rises toward or against its upper stop 48.

The member 37 of the shelf lever has a poise 90 mounted to travel thereon, it being supported by a pair of upper rollers 91 which ride on the upper edge of this member, and a lower roller 92 is provided which is journaled on an arm 93 (Fig. 5) pivoted on a bolt 94, a spring 95 being attached to the poise by a pin 96 and to the arm 93 by a pin 97 and acting to press the roller 92 against the lower edge of the member 37 and thereby prevent tilting of the poise on said member. The poise is caused to travel along the member 37 of the shelf lever by an endless chain 98 which is connected to the poise by clips 98$^a$ and passes around a pair of sprocket wheels 99 and 100 journaled on bolts 101 and 102 secured to this member of the shelf lever, the bolt 101 being adjustable in a longitudinal slot 103 in the member 37 by a screw 104 for the purpose of taking up slack in the chain, and clamped in adjusted position by a bolt 105 which engages in a plate 106 connected to the bearing bolt 101.

Figures 4, 5, 6:
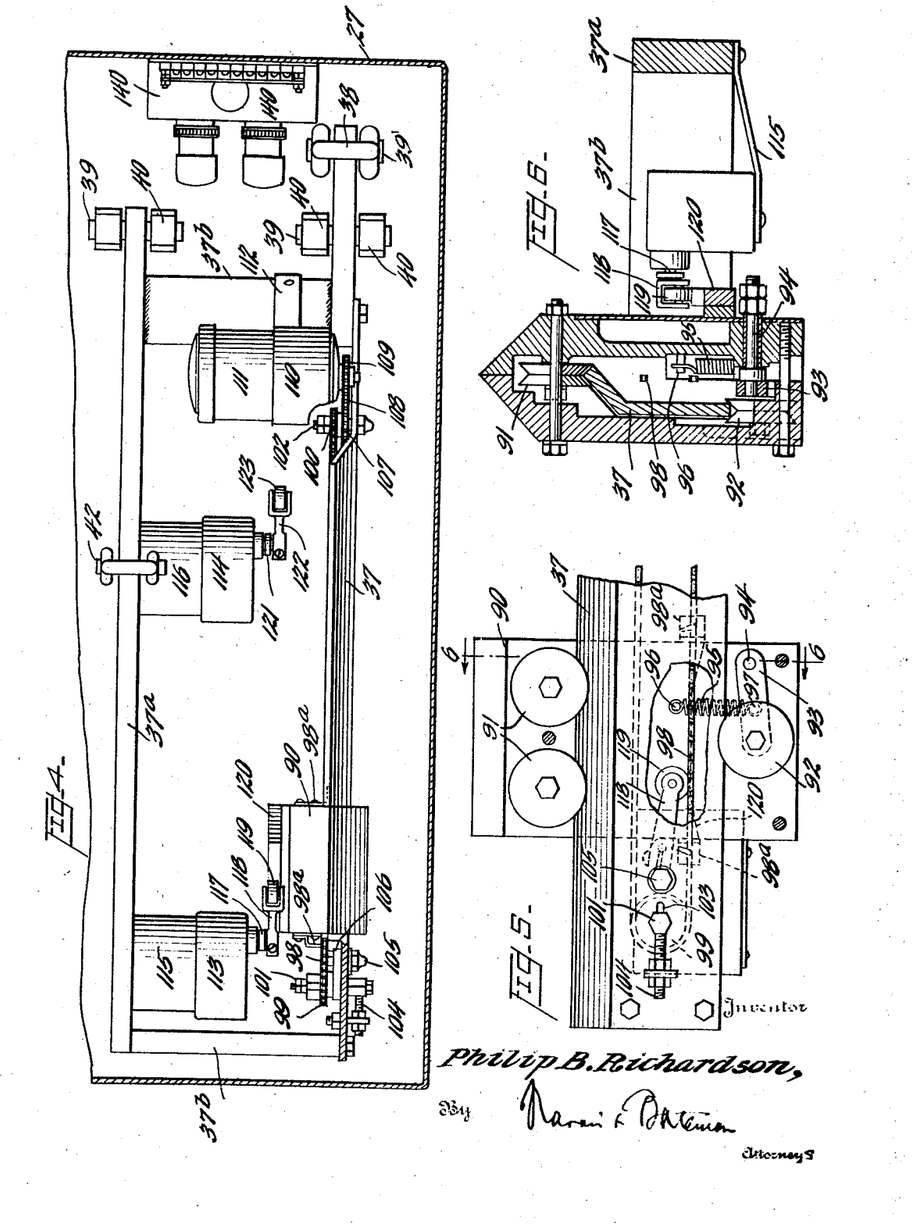
Figure 4 is a top plan of the shelf lever and poise, and associated operating motor and limit switches.
Figure 5 is an enlarged detail view of a portion of the shelf lever, and the traveling poise thereon.
Figure 6 is a vertical section taken on the line 6—6 in Fig. 5.

The sprocket 100 is driven by another sprocket 107 to which it is fixed, and by a chain 108 which meshes with a sprocket 109 on the output shaft of a suitable reduction gearing 110 carried by a reversible electric motor 111 which is preferably of the type having two armatures wound respectively for rotation in opposite directions and housed in a single casing. This motor may be supported on the shelf lever by a bracket 112 bolted or otherwise fixed to one of the cross members 37$^b$.

Figure 7:
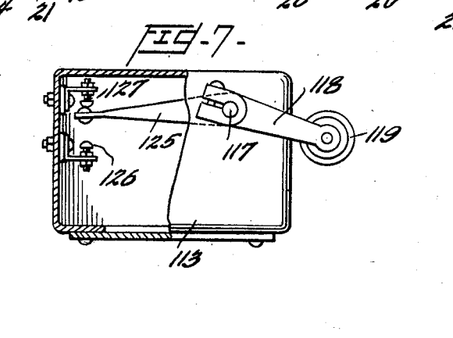
Figures 7 and 8 are detail views of the limit switches for the travelling poise.
Figure 8:
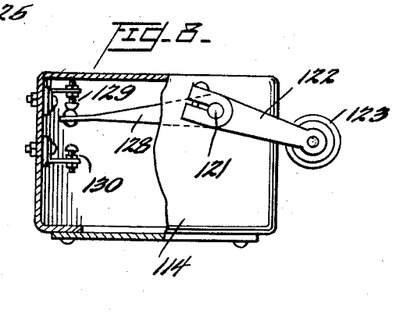

A pair of limit switches 113 and 114 (Fig. 4) are mounted on the shelf lever, as by brackets 115 and 116 secured to the shelf lever member 37$^a$. The operating shaft 117 of the switch 113, which is located near the free end of the shelf lever, has an arm 118 fixed thereto and carrying a roller 119 arranged to be engaged and lifted by a cam 120 secured to the poise 90 when the latter approaches or assumes its zero position adjacent to the left hand of the shelf lever as shown in Figs. 4 and 5. The operating shaft 121 of the switch 114, which is located toward the fulcrum of the shelf lever, has an arm 122 fixed thereon and carrying a roller 123 arranged to be engaged and lifted by the cam 120 when the poise 90 approaches the limit of the advancing movement toward the fulcrum of the shelf lever. The limit switch 113, as shown in Fig. 7 comprises a contact arm 125 fixed on the operating shaft 117 and is held in engagement with a contact 126 while the poise is in its zero position and the roller 119 lifted by the cam 120 but disengaging therefrom and engaging a contact 127 when the poise advances from its zero position. The limit switch 114, shown in Fig. 8, has a contact arm 128 fixed on its operating shaft 121, this contact arm normally engaging a contact 129 but disengaging therefrom when the poise reaches or passes the limit of its advance and the cam 120 on the poise lifts the roller 123. A warning signal, such as an electric bell, is preferably associated with the limit switch 114 to give warning to the attendant should, through accident, the overfeed supplied to the weigh conveyor exceed the amount the poise is capable of balancing out, the warning bell being operated, for example, by the cam 120 when it lifts the roller 123, thereby disengaging the contact arm 128 from the contact 129 and engaging it with a contact 130 controlling the circuit of the warning bell. A suitable terminal block 140 is preferably mounted in the beam box for the connections of the electrical conductors for the motor and the various switches in this box.

The beam controlled switches 59, 60, 84 and 85 and limit switches 113 and 114, and the poise operating motor 111 are connected in an electrical system with the electric feed motor 31 and electric discharge motor 14, whereby all of the operations of the machine are performed automatically in the proper sequence. In the electrical diagram shown in Fig. 9, the system is supplied, for example, with electric current from a three-phase power supply $L^1$, $L^2$ and $L^3$ represent the main power lines which are led to a feed motor starter switch 150 having three pairs of contacts for connecting the power lines to the respective terminals of the feed motor 31, this switch being normally open and provided with a solenoid 151 which, when energized, closes this switch to supply operating current to the feed motor. The main power lines are also led to a discharge motor starter switch 152 having three pairs of contacts for connecting the power lines to the respective terminals of the discharge motor 14, this switch being normally open and provided with a solenoid 153 which, when energized, closes this switch to supply operating current to the discharge motor.

Figure 9:
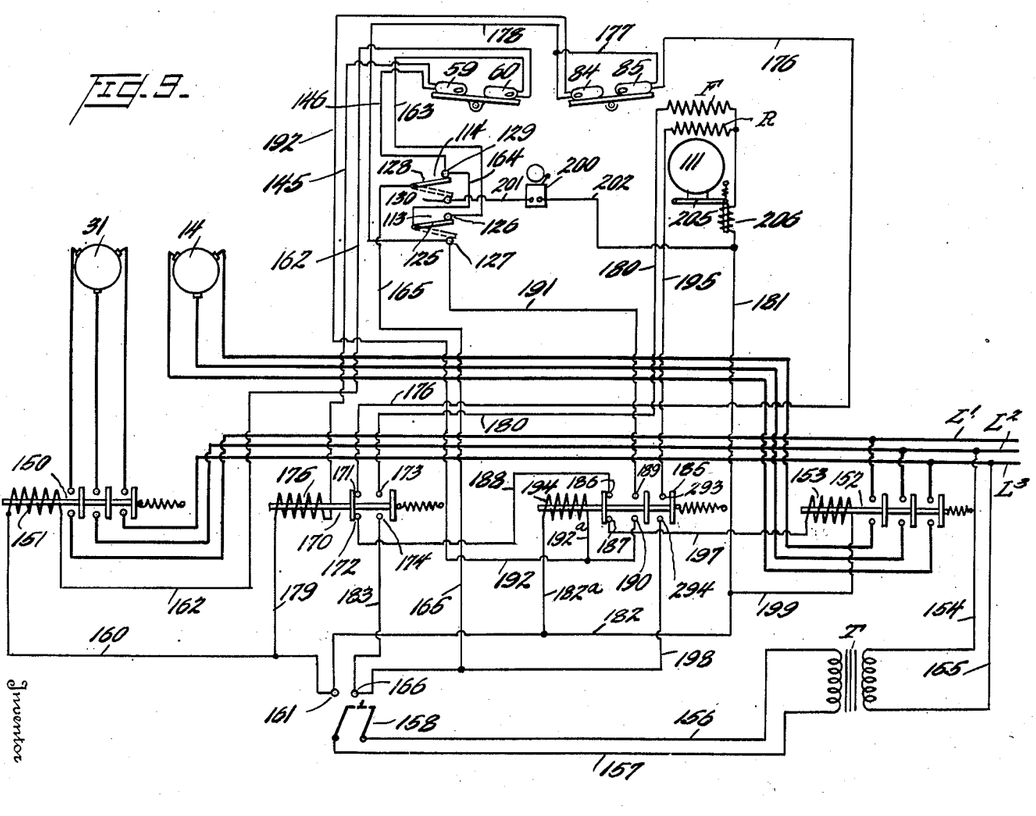
Figure 9 is an electrical diagram, showing the operating and controlling circuits.

The electric current for controlling the system and for operating the poise motor is preferably of a lower voltage than that of the main power lines but may be derived therefrom, it being supplied, for example, by conductors 154 and 155 from pair of the main power lines to the primary of a transformer T the secondary of which is connected by conductors 156 and 157 to a manual controlling switch 158.

One terminal of the solenoid 151 of the feed motor switch 150 is connected by a conductor 160 to the contact 161 of the switch 158, and the other terminal of this solenoid is connected by a conductor 162 to one of the contacts of the main beam switch 60, the other contact of the latter switch being connected by conductor 163 to the contact 126 of the limit switch 113. The contact arm 125 of limit switch 113 is connected by a conductor 164 to the contact 129 of the limit switch 114, and the contact arm 128 of the latter limit switch is connected by a conductor 165 to the other contact 166 of the switch 158.

The forward running of the poise motor 111 is controlled by a switch 170 having a pair of contacts 171 and 172 which are normally closed, and another pair of contacts 173 and 174 which are normally open, this switch having a solenoid 175 which, when energized, opens the contacts 171 and 172 and closes the contacts 173 and 174. The contact 171 is connected by a conductor 176 to one contact of the tare beam switch 85, the other contact of this switch being connected by conductors 177 and 178 to the contact 127 of the limit switch 113, the contact arm 125 of this limit switch being connected to the switch contact 166 by the conductor 164, contact 129 and contact arm 128 of the limit switch 114 and conductor 165. The solenoid 175 of the switch 170 is connected in a circuit which includes a conductor 179 leading from the contact 161 of switch 158, conductor 145 which is connected to one contact of the switch 59, and conductor 146 which leads from the other contact of switch 59 to the contact 129 of limit switch 114, the latter contact being connected by the contact arm 128 and conductor 165 to the contact 166 of the switch 158.

The contact 173 of switch 170 is connected by a conductor 180 to one terminal of the forward winding F of the poise motor 111, the other terminal of this winding being connected by conductors 181 and 182 to the contact 161 of the switch 158. The other contact 174 of the switch 170 is connected by the conductor 183 to the contact 166 of the switch 158.

The reverse running of the poise motor 111 is controlled by a switch 185. This switch comprises a pair of contacts 186 and 187, the former connected by a conductor 188 to the contact 172 of the switch 170, a pair of contacts 189 and 190, the contact 189 being connected by a conductor 191 to the contact 127 of limit switch 113, and the contact 190 being connected by a conductor 192 to one contact of the tare beam switch 84, the other contact of the latter switch being connected by conductors 178 and 191 through contact 127 of limit switch 113 to contact 189 of switch 185. Contact 190 of switch 185 is also connected by a conductor 192$^a$ to one terminal of a solenoid 194 for this switch, the other terminal of this solenoid being connected by conductors 182$^a$ and 182 to the contact 161 of the switch 158. The solenoid 194, when energized, opens the contacts 186 and 187 and closes the contacts 189 and 190, and while the contact arm 125 of limit switch 113 engages the contact 127, as while the poise 90 is removed from its zero position, the solenoid 194 will be maintained in an energized condition and will hold closed the contacts 189 and 190 of this switch, and also a pair of contacts 293 and 294 of this switch. Contact 293 is connected by a conductor 195 to one terminal of the reverse winding R of poise motor 111, the other terminal of this winding being connected by conductors 181 and 182 to the contact 161 of the switch 158. The contact 294 of switch 185 is connected by a conductor 198 to the contact 166 of the switch 158. The contact 187 of switch 185 is connected by a conductor 197 to one terminal of the solenoid 153 of the discharge controlling switch 152, the other terminal of this solenoid being connected by a conductor 199 and conductor 182 to the contact 161 of the switch 158. A warning signal, such as an electric bell 200, is preferably employed to inform the attendant when the poise has reached or passed the limit of its advance and is not capable of balancing the load on the weigh conveyor, so that the attendant may take proper steps to remedy the condition. As shown, one terminal of the bell is connected to the contact 130 of the limit switch 114 by a conductor 201 and the other terminal of the bell is connected to the contact 161 of the switch 158 as by a conductor 202 connected to the conductors 181 and 182. The contact 130 will be engaged by the contact arm 128 of the limit switch 114 when the latter is operated by the poise as it reaches or passes the limit of its advance, thereby completing a circuit through the conductor 165 to the other contact 166 of the switch 158.

The operation of a weighing machine constructed as shown and hereinbefore described is as follows:

The counterweight W for the tare beam 36 is made up of weights of a value to balance the proportion of a predetermined permanent residue supported by the tare beam which will be sufficient to offset the sticking of mud or similar material on the weigh conveyor 10 and to insure a full discharge stream therefrom; and the counterweight W for the main beam 35 is made up of weights of a value to balance the proportion of such predetermined residue supported by the main beam and also weigh weights of a value to balance the weight of material desired for each discharge. For example, if each weighing is to be 1500 pounds, the counterweight w for the tare beam may be of such a value that the tare beam will come to balance when the weigh conveyor contains a residue of 10000 pounds, and the counterweight W for the main beam of such a value that it will come to balance when the weigh conveyor contains 25000 pounds of material.

At the commencement of each weighing operation following each discharge of material from the weigh conveyor, the main beam will rest on its lower stop 55 and the tare beam will be in balance, so that the beam switches 60 and 84 will be closed and the switches 59 and 85 will be open, and the poise 90 on the shelf lever will occupy its zero position adjacent to the free end of the shelf lever, as shown in Figs. 3 and 4, and the contact arm 125 of the limit switch 113 will be held in engagement with the contact 126 by the engagement of the cam 120 with the roller 119, and the arm 128 of the limit switch 114 will engage the contact 129. Manual closing of the switch 158 will then cause the feed motor switch 150 to close and thus complete the operating circuit from the power lines L¹, L² and L³ to the feed motor 31 which drives the feed conveyor 30, under control of a circuit leading from the switch contact 161 through conductor 160 and solenoid 151 of the feed motor controlling switch 150, thence by conductor 162 to switch 60 and from the latter by conductor 163 to contact 126 and contact arm 125 of limit switch 113, thence by conductor 164 to contact 129 and through contact arm 128 of limit switch 114 and then by conductor 165 to contact 166 of switch 158. The feed conveyor is thus set into operation to feed material therefrom onto the scale supported weigh conveyor 10, which is then at rest, and this feeding operation continues until the weight of material for which the main beam is set, as for example 2500 pounds, has been fed to the weigh conveyor, whereupon the main beam rises, opening the switch 60 and thereby de-energizing the solenoid 151 and thus allowing the feed controlling switch 150 to return to its normally open position, in consequence of which the operation of the feed conveyor is stopped. However, although the feed conveyor is stopped at the moment the weight of material balanced by the counterweight W of the main beam has been received by the weigh conveyor, additional material, which may amount to 200 to 300 pounds, falls from the feed conveyor onto the weigh conveyor, and as such material falling after the stoppage of the feed conveyor is not compensated for, the material on the weigh conveyor is a heavy weighing or exceeds the desired weighing.

Rising of the main beam closes the switch 59, thereby causing the poise 90 to advance along the shelf lever toward its fulcrum to balance out the overweight of material on the weigh conveyor and bring the beams to balance, closing of the switch 59 completing an electric circuit through the poise motor 111 to operate it in the forward or poise advancing direction, said circuit leading from the switch contact 161 through conductor 179 and solenoid 175 of forward motor controlling switch 170, thence from said solenoid by conductor 145 to closed main beam switch 59, and from the latter by conductor 146 to contact 129 of limit switch 114 which is normally closed, and by contact arm 128 and conductor 165 to the other contact 166 of the switch 158. The consequent energizing of the solenoid 175 operates the switch 170 to disconnect its normally closed contacts 171 and 172 and to close its contacts 173 and 174. A circuit for the forward winding of the poise motor 111 is thus completed from the contact 161 of switch 158 through conductors 182 and 181 to one terminal of forward poise motor winding F, and from the other terminal of this winding by conductor 180 to contacts 173 and 174 and from the latter contact by conductor 183 to the other contact 166 of switch 158. The poise motor is thus caused to operate to advance the poise along the shelf lever from its zero or starting position toward the fulcrum of the shelf lever, and the advance of the poise continues until the poise has balanced out the weight of material in excess of the predetermined amount balanced by the counterweight W of the main beam, and the main beam then returns to balance.

Return of the main beam to balance opens the switch 59 and closes the switch 60. Opening of the switch 59 breaks the circuit through and de-energizes the solenoid 175, thereby causing the switch 170 to return to its normal position, opening the contacts 173 and 174, thereby breaking the circuit through the forward poise motor winding F and thus stopping the advance of the poise, and closing the contacts 171 and 172. The machine is then ready to discharge the desired predetermined weight of material from the weigh conveyor, the discharge taking place while the poise 90 is in the position into which it was advanced to bring the main beam to balance. The discharge of material from the weigh conveyor is effected by operation of the discharge motor 14 under control of the switch 152 through which power is supplied to said motor from the power lines L¹, L² and L³. The solenoid 153 of this switch is energized from the contact 161 of the switch 158 through conductors 182 and 199, and through the conductor 197 which connects it to the contact 187 of switch 185, the solenoid 194 of which, at this time, is deenergized and the contacts 186 and 187 are closed as the tare beam switch 84 connected in circuit therewith is then open since the tare beam is in raised position. This circuit is thus closed through the contacts 186 and 187, and through conductor 188 and closed contacts 171 and 172 of switch 170 which is then de-energized, conductor 176, tare beam switch 85 which at this time is closed, thence by conductors 171 and 178 to contact 127 of limit switch 113 which is engaged by the contact arm 125 of this switch while the poise is advanced from its zero or starting position, thence by conductor 164 to contact 129 of limit switch 114 which is normally engaged by the contact arm 128, and by conductor 165 to the contact 166 of switch 158.

The weigh conveyor is driven by the discharge motor 14 controlled by the circuit just described to weigh out or discharge an amount of material therefrom equal to the desired predetermined weighing, or 1500 pounds in the example assumed, whereupon the tare beam comes to balance and the operation of the weigh conveyor is stopped to interrupt the discharge. The stopping of the discharge of material from the weigh conveyor is effected by opening of the switch 85 by the tare beam when it comes to balance, breaking of the circuit of the solenoid 153 by the opening of this switch de-energizing it and causing the switch 152 to open, thus cutting off the power from the discharge motor 14.

After the desired predetermined weight of material has been discharged from the weigh conveyor, the poise 90 is returned to its zero or starting position. As previously stated, during the discharge of material from the weigh conveyor, the poise remains in the position to which it was advanced to balance out the overweight. This is because the solenoid 194 for the switch 185, the contacts 293 and 294 of which control the reverse winding R of the poise motor, is deenergized due to the open condition of the switch 84 while the tare beam is in raised position. However, when the tare beam comes to balance in consequence of the discharge of the desired predetermined weight of material from the weigh conveyor, the switch 84 is closed. The solenoid 194 of the switch 185 controlling the reverse winding R of the poise motor is then energized through conductors 182 and 182ᵃ leading thereto from the contact 161 of switch 158, and through conductors 192ᵃ and 192, switch 84, conductor 178, contact 127 and contact arm 125 of limit switch 113 which are then engaged, conductor 164, contact 129 and contact arm 128 of limit switch 114 which is then closed, and by conductor 165 to contact 166 of switch 158. Energizing of the solenoid 194 operates the switch 185 to close the contacts 293 and 294 thereof, thereby completing an operating circuit from contact 161 of switch 158 through conductors 182, and 181 to one terminal of reverse winding R of the poise motor, and from the other terminal of this winding through conductor 195 and closed contacts 293 and 294, then by conductor 198 to the other contact 166 of switch 158. Energizing of the solenoid 194 also causes the switch 185 to engage the contacts 189 and 190, thereby completing a holding circuit for this solenoid from terminal 161 through conductors 182, 182ᵃ and 192ᵃ and 191 to contact 127, thus maintaining the contacts 293 and 294 closed. The reverse winding R of poise motor 111 is thus rendered effective to return the poise 90 to its zero or starting position on the shelf lever, and as the poise reaches such position, the cam 120 on the poise operates the limit switch 113 to disengage the contact arm 125 thereof from the contact 127, thereby breaking the energizing circuit of the solenoid 194. The consequent deenergizing of this solenoid causes the switch 185 to open the contacts 293 and 294 thereof, thus breaking the circuit through the reverse winding R of the poise motor and stopping the reverse or return movement of the poise when it reaches its zero or starting position. Operation of the limit switch 113 by the cam to disengage its contact arm 125 from the contact 127 engages said contact arm with the contact 126 of this switch, thus preparing the system for the next subsequent cycle of operations which will be repeated automatically while the controlling switch 158 is closed.

Since the contact arm 125 engages the contact 126 of the limit switch only while the poise is in zero position, the operation of the feed conveyor is confined to the period when the poise is in that position. As the contacts 171 and 172 of the switch 170 controlling the advance of the poise are open during the advance of the poise, because of the closed condition at that time of the main beam switch 59 controlling the solenoid 175, and the contacts 171 and 172 control the solenoid 153 of the switch 152 controlling the operation of the weigh conveyor, discharge of material from the weigh conveyor can not take place until the poise has completed its advance to balance the load on the weigh conveyor, and the main beam comes to balance. The contacts 186 and 187 of switch 185 are open during the reverse movement or return of the poise to zero, due to the closed condition at that time of the tare beam switch 84 and of the holding circuit for the solenoid 194 which is then completed through the contacts 189 and 190, so that although the return movement of the poise causes the tare beam to rise and close switch 85, the discharge motor can not start the weigh conveyor, as the contacts 186 and 187 control the solenoid 153 of the discharge motor switch 152. The contacts 186 and 187 are closed when the poise has returned to its zero position, but starting of the discharge motor at this time is prevented by the limit switch 113 the contact arm 125 of which is then disengaged from the contact 127, thus opening the circuit of the solenoid 153 of the switch 152.

Although the return of the poise to its zero or starting position causes the tare beam to rise and open the switch 84 in the circuit with the solenoid 194 of the switch 185 which controls the reverse movement of the poise, the circuit of the solenoid 194 is held closed until the poise completes its return travel by the contacts 189 and 190 of this switch which are in circuit with the solenoid 194 and are closed while said solenoid is energized and maintain this solenoid in energized condition until the poise has returned to its zero position and the cam 120 has operated the limit switch 113 to disengage its contact arm 125 from the contact 127, whereupon the solenoid 194 is de-energized and the reverse operation of the poise motor is stopped.

The poise motor 111 is preferably of the type having a brake which is released by a solenoid energized when operating current is supplied to the motor, to prevent over-running of the poise when the operating current to the motor is cut off, such spring applied brake 205 being indicated diagrammatically in Fig. 9, and provided with solenoid 206 which retracts or releases the brake when the respective windings of the motor are energized. Also, to compensate for such over-run of the travelling poise as may take place, the compensating weight 62 may be adjusted along along the lever 61 in one or the other direction. The weight 73 may be adjusted in one or the other direction along the compensating lever 68 connected to the tare beam, according to whether the weighings discharged from the weigh conveyor are light or heavy, this compensating lever aiding the tare beam in coming to a balance and stopping the discharge after a weighing has been discharged from the weigh conveyor.

The present invention provides weighing mechanism which is suitable for the weighing of materials of various kinds, although it may be used very advantageously in the weighing of materials which are lumpy and can not be fed smoothly or compensated, and which are sticky and tend to cling more or less to the weigh conveyor or other element, and the accurate weighing of which has presented a difficult problem. The difficulties have been overcome by the present invention by providing the tare beam with counterweights for balancing a permanent residue to offset the material adhering to the weigh conveyor or other weighing element, and providing the main beam with counterweights for balancing such permanent residue and also weigh weights for balancing the desired weighings, and providing a travelling poise on the shelf lever which balances out the over-feeds to the weigh conveyor or other weigh receptacle. In this manner, compensation for the material falling to the weigh conveyor or weigh receptacle at the moment the feed is cut off is unnecessary to attain accurate weighings, and although considerable and varying amounts of material may fall to the weigh conveyor or receptacle after the feed is stopped, due to the lumpy or sticky nature of the material being weighed, the poise will balance out such over-fed amounts of material. The tare beam controlling the weighing out or discharging operation of the weigh conveyor or receptacle is therefore capable of stopping the discharge of material therefrom when the weight for which the machine is set has been discharged. Since the amounts of material over-fed in making up one weighing and remaining on the weigh conveyor or receptacle will be added to the succeeding loads fed thereto, and the poise returns to zero after each discharge, accumulation of such over-feeds does not take place.

The control system provided enables the cycle of operations hereinbefore described to take place automatically.

I claim:

1. Weighing apparatus comprising, in combination, a weigh receptacle and means for feeding material thereto, weighing mechanism including main and tare beams having means for proportionally balancing the weight of the weigh receptacle and a predetermined residue of material, the main beam having also means for balancing a predetermined desired weighing, and a member connected to and movable with said beams and having a poise movable thereon and of a value to balance an excess weight of material fed to the weigh receptacle, and means controlled by the weighing mechanism for moving said poise into a position to balance said excess weight, and means controlled by the weighing mechanism and operative while said poise is in a position to balance said excess weight for discharging material from the weigh receptacle until said residue is balanced.

2. Weighing apparatus comprising, in combination, a weigh receptacle, weighing mechanism including a tare beam having means for balancing a portion of the weight of said receptacle and a predetermined residue supported thereby, and a main beam having means for balancing another portion of the weight of said receptacle and residue and also a predetermined desired weighing, a member connected to said beams to operate therewith and having a poise movable thereon and of a value to balance a weight of material fed to the weigh receptacle in excess of said residue and desired weighing, means controlled by the weighing mechanism for moving said poise into a position to balance said excess weight of material, and means controlled by the tare beam for discharging material from the weigh receptacle while said poise is in a position to balance the excess weight of material, until the tare beam balances.

3. Weighing apparatus comprising, in combination, a weigh receptacle, weighing mechanism including main and tare beams having means for conjointly balancing the weight of said receptacle and a predetermined residue of material, the main beam having also means for balancing a predetermined desired weighing, means controlled by the main beam for feeding material to the weigh receptacle and for stopping the feed when said beam balances, a lever connected to and movable with the main and tare beams and having a poise movable thereon, means controlled by the weighing mechanism for moving said poise to balance an excess weight of material supplied to the weigh receptacle after stopping of the feed, and means controlled by the weighing mechanism for removing material from the weigh receptacle while the poise is in a position to balance said excess of material, until the tare beam balances.

4. Weighing apparatus comprising, in combination, a weigh receptacle, weighing mechanism including a tare beam having means for balancing a part of the weight of said receptacle and a predetermined residue of material supported thereby, a main beam having means for balancing another part of the weight of said receptacle and residue and having also means for balancing a predetermined desired weighing, means controlled by the main beam for feeding material to the weigh receptacle and for stopping the feed, a lever connected to and movable with said beams and having a poise movable thereon and capable of balancing an excess of material supplied to the weigh receptacle after stopping of the feed thereto, means controlled by the weighing mechanism for moving said poise from a given position in a direction to balance said excess of material, means controlled by the weighing mechanism for discharging material from the weigh receptacle while the poise is in a position to balance said excess of material, until only said predetermined residue remains thereon, and means controlled by the weighing mechanism for returning the poise to said given position after said discharge has been completed.

5. Weighing apparatus comprising, in combination, a weigh receptacle, main and tare beams having means for balancing portions of the weight of said receptacle and a predetermined residue of material supported thereby, the main beam having also means for balancing a predetermined desired weighing, means controlled by the main beam for feeding material to the weigh receptacle and for stopping the feed when the main beam balances, a lever connected to and movable with said beams and having a poise movable from a predetermined position thereon and capable of balancing an excess of material falling to the weigh conveyor after the main beam balances, means controlled by the main beam for advancing the poise from said predetermined position on said lever to a position to balance said excess of material, means controlled by the tare beam for discharging material from the weigh receptacle while the poise occupies said advanced position until the tare beam balances, and means controlled by the tare beam for causing return of the poise to said predetermined position after the discharge of material from the weigh receptacle has been completed.

6. Weighing apparatus comprising, in combination, a weigh receptacle, main and tare beams having means for proportionally balancing the weight of the weigh receptacle and a predetermined permanent residue of material supported thereby, the main beam having also means for balancing a predetermined desired weighing, a conveyor for feeding material to the weigh receptacle, means controlled by the main beam for operating the conveyor to feed material to the weigh receptacle and for stopping said feeding means when the main beam rises, a lever connected to and movable with said beams and having a poise movable from a predetermined position thereon and capable of balancing the weight of an excess of material received by the weigh receptacle after stopping of the conveyor, means controlled by the main beam for advancing the poise from said predetermined position until it balances said excess of material, means controlled by the tare beam for discharging material from the weigh receptacle while the poise is in said advanced position until the tare beam balances, and means controlled by the tare beam for causing return of the poise to said predetermined position after the tare beam comes to balance.

7. Weighing apparatus comprising, in combination, means for supporting material to be weighed and including a conveyor for removing material therefrom, means for feeding material to said material supporting means, main and tare beams having means for proportionally balancing the weight of said material supporting means and a predetermined residue of material thereon, the main beam having also means for balancing a predetermined desired weighing, a member connected to said beams and having a poise movable from a predetermined position thereon to exert a variable balancing influence upon an excess of material received by the material supporting means after the stopping of the feeding means, means controlled by the main beam for advancing the poise to a position where it balances such excess of material, means controlled by said beams and operative, while the main beam is in balance and the poise occupies such advanced position, to operate said conveyor to discharge material until the tare beam comes to balance, and means controlled by the tare beam and operative after it comes to balance to cause return of the poise to said predetermined position.

8. Weighing apparatus comprising, in combination, a weigh conveyor, main and tare beams having means for proportionally balancing the weight of said conveyor and a predetermined residue of material thereon, the main beam having also means for balancing a predetermined desired weighing on said conveyor, means controlled by the main beam for feeding material to the weigh conveyor and for stopping the feed when the main beam rises, a member connected to said beams and having a poise movable from a predetermined position thereon and capable of balancing the weight of an excess of material falling to the weigh conveyor when the feeding means stops, means controlled by the main beam for advancing the poise from said predetermined position until it balances said excess of material, means controlled by said beams and operative, while the main beam is in balance and the poise occupies its advanced position, to operate the weigh conveyor to discharge material therefrom until the tare beam comes to balance, and means controlled by the tare beam and operative after it comes to balance, to cause return of the poise to said predetermined position.

9. Weighing apparatus comprising, in combination, a weigh conveyor having an electric motor for operating it, means having an electric motor for operating it to feed material to the weigh conveyor, main and tare beams having means for proportionally balancing the weight of the weigh conveyor and a predetermined residue of material thereon, the main beam having also means for balancing a predetermined desired weighing, a lever connected to and movable with said beams, a poise having an electric motor for driving it from a predetermined position on said lever to balance an excess of material falling from the feeding means onto the weigh conveyor when the feeding means is stopped, and for returning the poise to said predetermined position, means including electric switch means controlled by the main beam for causing operation of the feeding means by its motor and for stopping the operation thereof when the main beam rises, means including switch beams controlled by the main beam for energizing the poise motor to advance the poise on said lever until it balances said excess of material, means including switch means controlled by the tare beam for energizing the weigh conveyor motor to operate the weigh conveyor to discharge material therefrom until the tare beam balances, and means including switch means controlled by the tare beam for energizing the poise motor to return the poise to said predetermined position.

10. Weighing apparatus according to claim 9, including switch means controlled by said poise for preventing operation of the motor for the feeding means except while the poise is in said predetermined position.

11. Weighing apparatus according to claim 9, including a switch connected in circuit with the switch means controlled by the main beam for causing operation of the feeding means, and a cam carried by the poise and operative to close said switch when the poise returns to said predetermined position, and to cause opening of said switch when the poise advances from said position.

12. Weighing apparatus according to claim 9, including a switch connected in circuit with the switch means controlled by the tare beam for causing operation of the weigh conveyor, and means on the poise for opening said switch while the poise is in said predetermined position to prevent discharging operation of the weigh conveyor.

13. Weighing apparatus according to claim 9, including a limit switch operative by the poise as it reaches a limit in its advance to interrupt the operation of the poise advancing motor and to give a warning signal.

14. Weighing apparatus according to claim 9, including a limit switch operative by the poise during its advance to stop the poise when it reaches a predetermined limit, and another limit switch operative by the poise when it returns to said predetermined position to stop such return movement of the poise.

15. Weighing apparatus comprising a scale system, a weigh receptacle supported thereby, means controlled by the scale system for feeding material to the weigh receptacle in excess of a predetermined weight, means controlled by the scale system for balancing out the weight of material in excess of said predetermined weight, means for balancing a lesser predetermined weight of material, and means controlled by the scale system for discharging material from the weigh receptacle while the scale system remains under the influence of said excess weight balancing out means until the scale system balances said predetermined lesser weight of material.

16. Weighing apparatus comprising a scale system having a weigh receptacle supported thereby, and counterbalancing means operative to balance the weigh receptacle under the influence of a predetermined weight and also a lesser preset weight of material, means controlled by the scale system for feeding material to the weigh receptacle in an amount in excess of said predetermined weight, means controlled by the scale system for balancing the weigh receptacle while under the influence of said excess weight of material, and means controlled by the scale system for discharging material from the weigh receptacle while said excess weight balancing means continues its influence on the scale system until the counterbalancing means balances the scale system at said lesser preset weight of material.

17. Weighing apparatus comprising a scale system having a weigh receptacle supported thereby, and counterbalancing means for balancing a predetermined weight and counterbalancing means for balancing a lesser predetermined weight of material supported by the weigh receptacle, means controlled by the first-mentioned counterbalancing means for feeding material in excess of said predetermined weight to the weigh receptacle, means controlled by the scale system for balancing the weight of material in excess of said predetermined weight, and means controlled by the second-mentioned counterbalancing means for discharging material from the weigh receptacle while the scale system remains under the influence of said means for balancing said excess weight of material until the weigh receptacle is balanced by said second-mentioned counterbalancing means.

18. Weighing apparatus comprising a scale system having a weigh receptacle supported thereby and counterbalancing means controlled by operation of the scale system to act thereon to one extent to balance a predetermined weight and to act on the scale system to a reduced extent to balance a lesser preset weight of material acting on the weigh receptacle, means controlled by the scale system for feeding material to the weigh receptacle in an amount in excess of said predetermined weight, auxiliary means to act on the scale system in conjunction with the counterbalancing means while acting to said one extent to balance said predetermined and excess amount of material and thereby bring the scale system to balance, and means controlled by the scale system for discharging material from the weigh receptacle while the counterbalancing means remains under the balancing influence of said auxiliary means until the scale system comes to balance under the influence of the reduced extent of action of the counterbalancing means and said lesser preset weight of material.

PHILIP B. RICHARDSON.

REFERENCES CITED

The following references are of record in the file of this patent:

UNITED STATES PATENTS

| Number | Name | Date |
|---|---|---|
| 764,530 | James | July 5, 1904 |
| 1,911,235 | Morrow | May 30, 1933 |
| 1,978,558 | Van Der Horst | Oct. 30, 1934 |
| 1,983,093 | Montgomery | Dec. 4, 1934 |
| 2,040,660 | Lenhart | May 12, 1936 |
| 2,298,967 | Richardson | Oct. 13, 1942 |
| 2,332,438 | Clifford | Oct. 19, 1943 |
| 2,336,347 | Clifford | Dec. 7, 1943 |
| 2,348,372 | Weckerly | May 9, 1944 |